(12) United States Patent
Beckman

(10) Patent No.: US 10,823,533 B2
(45) Date of Patent: Nov. 3, 2020

(54) FIREARM WITH ACTIVE AIMING ASSISTANCE AND PLANNING SYSTEM

(71) Applicant: Christopher V. Beckman, Los Angeles, CA (US)

(72) Inventor: Christopher V. Beckman, Los Angeles, CA (US)

( * ) Notice: Subject to any disclaimer, the term of this patent is extended or adjusted under 35 U.S.C. 154(b) by 0 days.

(21) Appl. No.: 16/280,017

(22) Filed: Feb. 19, 2019

(65) Prior Publication Data

US 2019/0316878 A1   Oct. 17, 2019

Related U.S. Application Data

(63) Continuation-in-part of application No. 15/628,614, filed on Jun. 20, 2017, now Pat. No. 10,209,035, which is a continuation-in-part of application No. 15/245,165, filed on Aug. 23, 2016, now Pat. No. 9,778,003, which is a continuation-in-part of application No. 14/828,514, filed on Aug. 17, 2015, now Pat. No. 9,423,223, which is a continuation-in-part of application No. 13/666,965, filed on Nov. 2, 2012, now Pat. No. 9,109,864, said application No. 15/628,614 is a continuation-in-part of application No. 13/615,513, filed on Sep. 13, 2012, now Pat. No. 9,683,813.

(51) Int. Cl.
| | | |
|---|---|---|
| *F41G 1/38* | (2006.01) |
| *F41G 1/46* | (2006.01) |
| *F41G 3/08* | (2006.01) |
| *F41G 11/00* | (2006.01) |
| *F41G 3/06* | (2006.01) |
| *F41G 3/16* | (2006.01) |
| *F41G 3/00* | (2006.01) |

(52) U.S. Cl.
CPC ............. *F41G 1/46* (2013.01); *F41G 3/06* (2013.01); *F41G 3/08* (2013.01); *F41G 11/00* (2013.01); *F41G 3/005* (2013.01); *F41G 3/165* (2013.01)

(58) Field of Classification Search
CPC ..... F41G 3/06; F41G 3/08; F41G 1/38; F41G 1/473
USPC ........................................................ 235/404
See application file for complete search history.

(56) References Cited

U.S. PATENT DOCUMENTS 10,415,933 B1 *   9/2019   Kleck .................. F41G 3/06

* cited by examiner

*Primary Examiner* — Jamara A Franklin

(57) ABSTRACT

New systems, hardware and methods for extremely precise aiming and shooting of firearms by relatively unskilled users are provided. In some embodiments, shots may be planned in advance and rapidly carried out. A specialized control system comprising computer hardware allows a user to plot a planned shot or shot sequence with indicators on a site display, evaluate the accuracy of the planned shot(s), adjust the location of the shot(s), and then shoot. In some embodiments, the system may counteract and otherwise adjust for certain ballistic and other accuracy-impacting factors with a position-actuable firing mechanism to maintain a projected flight path of such a point of impact at all times. The system is unobtrusive, allowing users to engage ordinary targeting activity, including ordinary firearm aiming movements. In some embodiments, aiming and execution aspects of the invention are adapted to non-lethal measures, which may be assigned by the system autonomously.

19 Claims, 8 Drawing Sheets

FIREARM WITH ACTIVE AIMING ASSISTANCE AND PLANNING SYSTEM

CROSS-REFERENCE TO RELATED APPLICATION

This application is a continuation-in-part of U.S. patent application Ser. No. 15/628,614, filed Jun. 20, 2017, now U.S. Pat. No. 10,209,035, which is a continuation-in-part of U.S. patent application Ser. No. 13/615,513, filed Sep. 13, 2012, now U.S. Pat. No. 9,683,813. This application is also a continuation-in-part of U.S. patent application Ser. No. 15/245,165, filed Aug. 23, 2016, now U.S. Pat. No. 9,778,003, which is a continuation-in-part of U.S. patent application Ser. No. 14/828,514, filed Aug. 17, 2015, now U.S. Pat. No. 9,423,223, which is a continuation-in-part of U.S. patent application Ser. No. 13/666,965, filed Nov. 2, 2012, now U.S. Pat. No. 9,109,864. The entire contents of each of the above applications are hereby incorporated by reference into the present application as if fully set forth herein.

FIELD OF THE INVENTION

The present invention relates to the field of firearms and targeting systems and methods.

BACKGROUND

Projectile-firing weapons have been in use at least since the end of the upper Paleolithic period, when archery (the "bow and arrow") had been invented. A bow is a projectile-firing weapon in which at least one flexible member creates tension in an attached line, which line may be drawn, flexing the member, and then released to propel a projectile known as an arrow by the elastic rebound of the member and line. In modern warfare, firearms and ballistic missiles use propellants to accelerate projectiles at much higher speeds and to strike distant targets, some of which may be difficult, or even impossible, to view with the naked eye. To capitalize on those capabilities and help direct such projectiles to their distant targets, targeting science has been developed.

A wide variety of aiming devices, known as "sights," have been developed, and allow a user to aim a projectile weapon at a target using the user's vision to align the two. For example, a rifle-mounted telescopic sight (a.k.a. "scope") allows a marksman to target distant subjects, typically including the use of optic lenses and a superimposed reticle, often in the form of crosshairs meeting at a point associated with a point of impact of the projectile (a.k.a. "point of impact" or "Impact Point") at a target within an environment. Using scopes mounted on high-powered, long-range rifles, highly skilled military and police marksmen, known as snipers, may successfully target and hit subjects at an effective range above 1,000 meters.

However, environmental and user factors can greatly impact the accuracy of rifle and other projectile weapon fire, especially in the instance of ballistic projectiles from hand-held weapons, and especially when fired by less skilled shooters. These factors include, but are not limited to: 1) air density, 2) wind, 3) humidity, 4) visibility, 5) air quality, 6) elevation from subject, 7) ambient temperature, 8) hand and body tremor of the user, 9) shake and misalignment due to trigger pull, 10) flinching due to shot anticipation or environmental activity, 11) movement due to breathing, 12) movement due to heartbeat, 13) errant movements, 14) eye shift not addressed by the sight (parallax effect), 15) environmental structural changes or nudges (e.g., sand bag or tripod sinking, nudge from fellow person or other animal), 16) changes or states of change of any of the above factors, and 17) target object or other more general environmental movement. At longer firing ranges, the impact of these environmental and user factors, and resulting targeting inaccuracy, can be exponentially amplified. But greater ranges are beneficial, because they allow a sniper to maintain a safe distance from enemy forces and remain undetected. If snipers are located, critical missions may fail, and, in military campaigns, shooters, such as snipers, may be captured and assassinated.

Advanced reflecting and collimating sights, such as "red dot" sights, are designed to provide rapid acquisition and targeting with both eyes open and observing the entire environment as well as sight components. Such sights may also reduce or substantially eliminate the parallax effect that occurs when the shooter shifts eye position relative to the reticle of a scope or iron sights.

It should be noted that some of the disclosures set forth as background, such as, but not limited to, the above language under the heading "Background," do not relate exclusively to prior art and the state of the art in the field(s) of the invention, and should not be construed as an admission with respect thereto.

SUMMARY OF THE INVENTION

New targeting systems, hardware and techniques are provided. These systems enable a user to plan shooting or other measures with extreme precision within an environment, evaluate the plan's effectiveness, and execute the plan rapidly. In some aspects of the invention, a user of a targeting system according to some embodiments of the present invention may create, set, adjust and execute projected point(s) of impact, as shown by indicator(s), of a projectile on a target within a target environment. In other aspects, the system may counteract or avoid certain ballistic, viewing perspective and projectile accuracy-affecting factors, in both a sighting display and in a projectile firing mechanism. Yet, in some embodiments, the systems, hardware and techniques so counteract or avoid those factors while maintaining the influence of other factors, such as targeting movements by a user. In some embodiments, the systems, hardware and techniques allow for rapid targeting adjustment, by adjusting three-dimensional ("3D") positions and rotational attitudes in real time, to maintain an environmental view and a point of impact, and indicator thereof, despite those factors. The system is unobtrusive, allowing the user to engage ordinary targeting activity.

In some embodiments, an auxiliary probe is first launched and deployed at a target. Extremely precise, deliberate targeting for future projectiles, weapons or non-lethal measures is then made relative to the position and orientation of the probe, in some such embodiments.

In one embodiment, the invention enables a shooter to, in effect, take a projected, trial shot at a subject within an environment, evaluate its effectiveness, and then execute it only if satisfied. Prior to this invention, shots needed to either succeed or fail, with one, actual take—often with disastrous, irreversible consequences.

In other aspects of the invention, the system may execute multiple points of impact together or in rapid succession. In some such embodiments, such points of impact may surround, lead, cover or otherwise have a diverse distribution about a target and/or projected target subject path, based on movement and other environmental factors.

These aspects of the present invention may be applied to a wide variety of other technological fields, including, but not limited to, shipment and inventory tracking and photography.

In still other embodiments of the invention, a new form of projectile, which implements lift that increases at lower speeds to counteract gravitational drop, while maintaining rifle-driven spiraling, is provided.

RULES OF CONSTRUCTION AND GENERAL NOTES

Within this specification of aspects of the invention, including its embedded definitions, plural and singular constructions may be treated interchangeably unless otherwise indicated in context. Indicated gender pronouns may be treated interchangeably with neutral or other gender pronouns. The exact embodiments disclosed in this specification for carrying out aspects of the invention are presented as examples of some embodiments of the invention, to ease the reader's understanding of the invention, and are not exhaustive of all such examples or embodiments within the scope of the invention. Where applicable, other devices and methods of carrying out particular tasks and mechanics of the invention will be apparent to those of ordinary skill in the art, and such other devices and methods may also, or alternatively, be used, in some embodiments of the invention, and should be considered incorporated into the specification and within the scope of the invention.

DETAILED DESCRIPTION OF THE INVENTION

Figure 1:
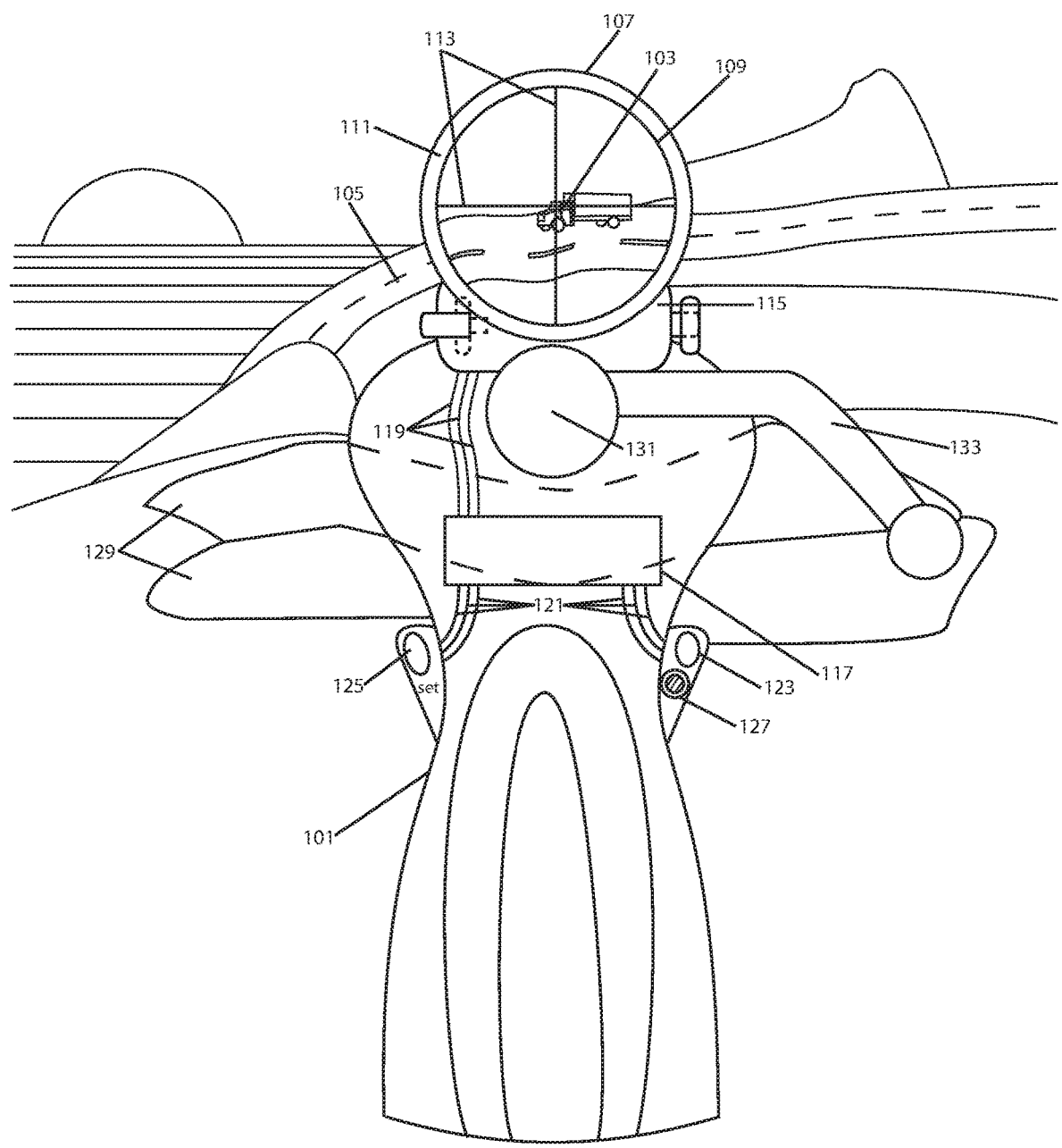
FIGS. 1-4 illustrate a user's perspective of a target subject, shooting environment, high-powered rifle with a telescopic sight and other aspects of a targeting system implementing various aspects of the present invention.

FIG. 1 is an illustration from a user's perspective of a target subject, surrounding environment, specialized high-powered rifle with a telescopic sight and other aspects of a targeting system implementing aspects of the present invention. Although the example of a specialized high-powered rifle is provided, it should be understood that this is not exhaustive of the numerous alternative contexts in which the invention may operate. For example, aspects of the invention may be applied to missile launching apparatuses, non-projectile ray-generating weapons or devices and other types of aimable devices, such as cameras.

The rifle, scope, targeting system and some environmental elements in this illustration will be repeated in additional figures, below, to illustrate the operation of aspects of the invention over time. A rifle 101 is trained/aimed in the general area of a subject (in this instance, the driver of a truck) 103 on a distant roadway 105. A telescopic rifle sight ("scope") 107 magnifies the subject 103 and some of the surrounding area, within it's viewing portal 109, which may be enclosed by a cylindrical housing 111 and may include a collimating lens assembly and/or electronic viewfinder display features, which may themselves be collimated and variable, and cover or augment the entire field of view of the viewing portal 109 in some embodiments, and will be discussed in greater detail below with reference to this and other figures. In some embodiments, the electronic viewfinder display aspects of the present invention are capable of creating variably-placed, -sized and -shaped images, including but not limited to virtual images, of a reticle and/or potential point-of-impact (a.k.a., "impact point") indicating dots and other indicator aspects, which images and/or virtual images may be instantaneously placed, moved, morphed, colored, provided with active lighting ("glow") or otherwise modified. In any event, a more standard, physical reticle with crosshairs 113 may, alternatively or in addition, in some embodiments, also be included, and may or may not itself be reflecting or collimated to ensure or correct for proper alignment and parallax in target sighting. Crosshairs 113 converge at a point initially generally corresponding with a point of impact of a projectile to be fired from the rifle, but the convergence point may be subject to adjustment to account for wind, range, angle/drop vector and other ballistic and/or environmental factors, such as those mentioned above, in some embodiments. An electronically-actuated variable mounting 115 permits the adjustment of the horizontal and vertical position of the viewing portal 109 and/or the crosshairs 113, and may also allow adjustment of the rotational angle of the scope as may be required for it to remain viewing at least part of a selected target, as will be discussed in greater detail later in this application with respect to certain embodiments, but this aspect need not be included in all embodiments of the invention. Alternatively, a partially or entirely artificial image viewfinder or other display, such as, but not limited to a light-emitting diode (LED or OLED) or other electronic/photonic display aspect(s), in some embodiments, may be used to create images in the viewing portal corresponding with a view of at least part of the target environment. In some such embodiments, variably-angled sensors or cameras may also be used in place of scope lenses and variable mounting 115 may not be required.

A system including control system unit 117 (which may be a control system comprising computer hardware and software, as discussed in reference to FIG. 5, below), may permit the actuation of servo/motors (also not pictured) within the mounting 115, enabling such angle, horizontal and vertical adjustments to the mounting 115 and/or display image output of the viewing portal 109, in some embodiments of the invention. In some such embodiments, the control system may make any of the adjustments required by a particular implementation of the invention. Preferably, electrical leads 119 allow electronic signal and command communication between the control system unit 117 and mounting 115 and viewing portal 109. Electrical leads 121 further allow electronic communication between the control system unit 117 and various finger- or thumb-actuated user input controls 123-127. Although local, electrical leads are shown in the example provided in the figure, it should be understood that any method of signal and command communication may alternatively be used, including but not limited to electronic or electromagnetic (such as radio frequency) methods of such signaling and communication known in the art. In addition, although the control system unit 117 is shown as physically attached to the rifle and/or other aspects of the system, the control system unit and user controls may be located anywhere where they may make the commands and communications necessary to carry out the aspects of the invention discussed in this application. A remote control unit and/or user controls, and non-human rifle support and control actuation system, along with live feedback from sensors and/or cameras, may also, or alternatively, be used.

The stock or barrel of rifle 101 may be rested on a stabilizing support, in some embodiments. For example, in some embodiments, rifle 101 may be rested on sandbags 129. In some embodiments, rifle 101 may be rested on any suitable support for resting the rifle and enhancing physical stability, such as a tripod, or other stabilizing prop, and/or the shooter's arm (not pictured). A bolt action 131 and optional manual reloading bolt lever 133 may be used for chambering cartridges and actuating a firing mechanism, including a firing pin and barrel, in accordance with aspects of the present invention. In some embodiments, such a firing mechanism is angle-variable. One example of one form of angle-variable firing mechanism, in which the control system unit 117 controls adjustments of the angle of at least part of a firing mechanism, is provided with respect to FIG. 6. In some such embodiments, those adjustments are made relative to a part of a firearm other than the firing mechanism. In other words, in some embodiments, at least part of the firing mechanism of a firearm may be aimed by changes in its angle relative to an environment, and those changes in angle are different from changes in angle of another part of the firearm. As will be discussed with reference to FIG. 6, such a firing system may be controlled in its vertical and horizontal position as well as its rotational angle by its own instantaneously adjustable servo/motor mounting(s), as controlled by the control system unit 117, in some embodiments. In some embodiments, control system unit 117 generally will instantaneously match the angle of the barrel of the rifle to create a ballistic path that will coincide with at least one point(s) of impact(s) indicated by an impact point indicator generated in the viewing portal 109, in some embodiments. Such point(s) of impact(s) may be selectable by a user for editing in some embodiments. In some embodiments, such point(s) of impact(s) and may be plural and separately created and adjusted, as will be discussed in greater detail below. As also will be described in greater detail below, control system unit 117 may also cause such point(s) of impact(s), their set indicators (which will be discussed in greater detail below) and barrel aiming angles to remain fixed (or appear to remain fixed) in their position(s) with respect to an external reference point or frame of reference in the surrounding environment. In some embodiments, the control system unit 117 may maintain those position(s) with respect to an external reference point or frame of reference in the surrounding environment by counteracting and/or addressing movements with respect to such at least one such reference point or frame. In some embodiments, the control system unit 117 maintains those position(s) by tracking motion of at least part of a firing mechanism relative to an external reference point or frame of reference in the surrounding environment with inertial change sensors. In some embodiments, the control system unit 117 maintains those position(s) by tracking motion of at least part of a firing mechanism relative to an external reference point or frame of reference in the surrounding environment with sensed and tracked environmental reference points. In some such embodiments, the control system unit 117 also plots projections of anticipated future movements of at least part of the firing mechanism, based on current movements of at least part of the firing mechanism. In some such embodiments, the control system unit 117 also plots actions that may counteract such anticipated future movements. As another example, a specialized physical probe may also be deployed into the target environment, serving as that point of reference for the targeting system, with other impact point indicators and other target-relevant display information presented with a location, if applicable, relative to it. In some embodiments, such probes are also projectiles, which can be fired and planted within at least part of a surrounding environment. Exemplary probes 801 and 901, which may be projectiles in some embodiments, are discussed in greater detail below, in reference to FIGS. 8 and 9. As discussed in greater detail below, object-scanning and location-assessing sensors comprised in or comprising the targeting system may also assist the system in the relative positioning of potential impact point indicators, augmenting the appearance of target features, or other aspects of the invention. For example, in some embodiments, such sensors may include hardware generating probing electromagnetic signals. In some embodiments, such sensors may include cameras. In some embodiments, such sensors may include other imaging hardware. In some embodiments, such sensors may include other scanning hardware. In some embodiments, such sensors include range-finding hardware.

The following is a discussion of some of the ways in which a system according to aspects of the present invention may be used by a shooter to separately acquire and fire upon a target with high precision, while eliminating or reducing many external factors that otherwise might threaten accuracy. First, as shown in FIG. 1, a user brings the target and at least part of a general surrounding area into the viewing area of the viewing portal 109. It should be noted, however, that the system may sense, image, record and track more objects or other features of the surrounding environment in various embodiments, including the location of points of impact located outside the area visible in the viewing portal 109. At this point, the system 117 need not actuate mounting 115 nor alter the shooting angle of the rifle firing mechanism or part thereof, but the user or system may adjust the scope for windage, range and other ballistic variables as in conventional rifle scopes, and the rifle and scope. In some embodiments, the system may operate in a mode in which it may fire as an ordinary rifle, with making any such scope adjustments or firing mechanism angle and position adjustments. However, provided that the sniper has sufficient time and wishes to eliminate certain accuracy-impacting factors, the user may proceed to additional aiming and target acquisition steps using a system in accordance with some embodiments of the invention. For instance, the sniper may next press the point of impact creation button 123. In some embodiments, point of impact creation button 123 is located within range of a user's index finger when holding a handle of a firearm. In some embodiments, however, point of impact creation button 123 is located separately from a firing mechanism trigger (not shown), as pictured. However, in an alternative embodiment, a partial trigger compression or "pull" may itself serve to create a point of impact, and a point of impact indicator indicating the location of such a point of impact within a display of the viewing portal 109. Assuming that the user has created such a point of impact and point of impact indicator, we will proceed to discuss the effects of the steps set forth above, in FIG. 2, below.

Figure 2:
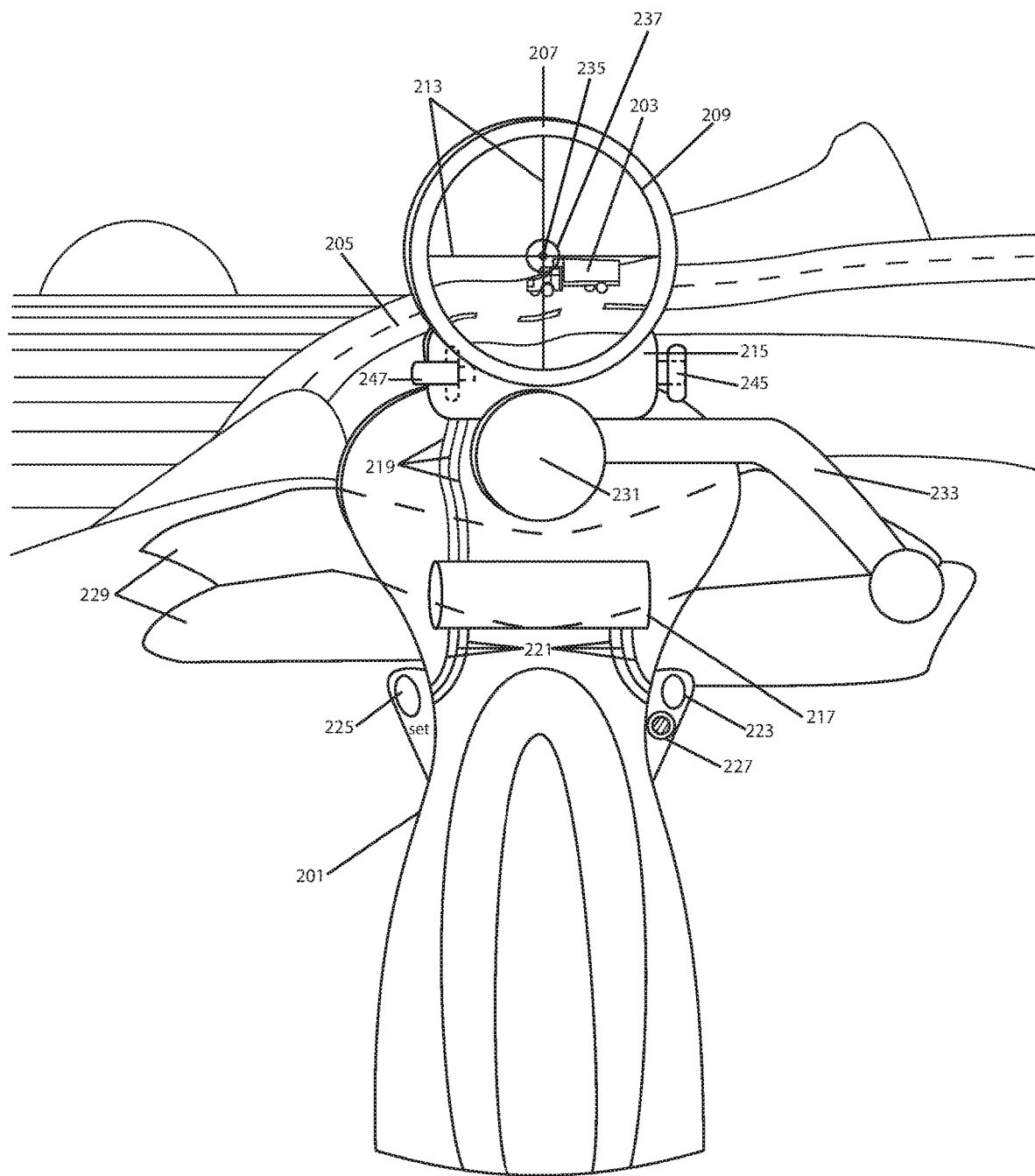

FIG. 2 is an illustration from the same perspective of the same target, shooting environment, high-powered rifle with a telescopic sight and other aspects of a targeting system as discussed with reference to FIG. 1, implementing additional aspects of the present invention. Carrying the discussion forward from FIG. 1, the latest step that the user has undertaken is to introduce a new point of impact and point of impact indicator into the viewing portal, now shown as 209. FIG. 2 illustrates the instant that such a new point of impact and indicator were created, and the location of the point of impact is shown as an illuminated dot 235 which serves as a point of impact indicator. In some embodiments, a concentric circle 237 serves as a point of impact indicator. In still other embodiments, any suitable shape that can be created by a display to illustrate a point of impact may be created as a point of impact indicator by the system. The point of impact indicator, such as 235 and 237, is created by display aspects of the viewing portal 209, such as an electronic display, electronically connected to the control system unit, now shown as 217. The new point of impact indicator may be created and appear directly in the center of the crosshairs, now 213, of the scope reticle and, in the instant of its creation, the point of impact indicator, such as illuminated dot 235, and the convergence of the crosshairs 213 each correspond with a point of impact of a projectile to be fired from the rifle. In some embodiments, as will be discussed in greater detail elsewhere in this application, the control system unit 217 may account for and address all relevant accuracy impacting factors by adjusting the position of at least part of a firing mechanism to ensure the selected location of the point of impact in the environment is hit by a projectile fired by the firing mechanism. In some embodiments, the control system unit may allow the user to address some or all relevant accuracy impacting factors while ensuring that the point of impact in the environment is hit by a projectile fired by the firing mechanism. In some embodiments, the control system unit 217 fires a projectile at a point of impact which has been created only after confirming that accuracy impacting factors have been addressed at the time that a projectile is fired. In some embodiments, such confirming includes updating data related to those accuracy impacting factors. In some embodiments, such data, once updated, is compared to previous data to those accuracy impacting factors and control system unit 217 only fires a projectile at a point of impact if the difference between the compared data is below a particular threshold. In some embodiments, the control system unit 217 fires a projectile at a point of impact which has been created only after confirming the location of the target. In some embodiments, such confirming the location of the target may be carried out by scanning the target, determining its location. In some embodiments, control system unit 217 only fires a projectile at a point of impact if the difference between the most current scanned location of a target is within a particular threshold distance of a previously scanned location of a target. In some embodiments, the control system unit 217 fires a projectile at a point of impact which has been created only after receiving a firing command from a user.

Continuing with an exemplary method embodiment illustrated in FIG. 2, due to user or environmental factors, however, such as breathing, hand shake, heartbeat, loss of grip, nudging, or support subsidence, for example, just before creation of the point of impact and point of impact indicator(s), both the reticle crosshairs 213 and the point of impact indicator(s) have, at least temporarily, been placed by the user slightly off target, to the upper-left-hand side of the of the intended target, the driver of the truck (or part thereof), rather than on or closer to the target's vicinity.

According to some embodiments of the present invention, in creating and maintaining the point of impact and point of impact indicator, additional aspects of which will be discussed in greater detail below, a system, including but not limited to the control system unit 217, may account for and apply ballistic and other projectile path correction functions to correct for or address any or all of the factors affecting or potentially affecting the accuracy of the point of impact indicator at indicating a point of impact of a projectile on a target, if and when such a projectile is fired from the rifle. The potential influence of such factors may be sensed by sensors (not pictured) which feed data to the system, such as, but not limited to, wind velocity, altitude, shot angle (and corresponding gravity vectors causing projectile drop over the range of a shot fired), barometric pressure, air temperature, humidity, environmental nudging or hand shake—such that position correction and/or intercept algorithms and/or functions may be applied to actuators controlling both the angle of at least part of the firing mechanism (such as a firearm barrel) and the scope, as necessary to maintain firing capability on a point of impact and maintain the point of impact indicator and target within the field of view of the scope. However, preferably, at this stage (where the point of impact has been created but not yet set), human and other environmental movement variables are allowed to continue to move the scope, reticle and point of impact indicator. In some embodiments, the system adjusts only the firing mechanism and barrel angle to maintain a set point of impact at the location corresponding with the new impact point, as it may move with the user's hand or other aiming movements, at this stage. This embodiment will be further illustrated, and discussed in greater detail, with respect to later figures.

To aid the system in counteracting gravity vectors causing projectile drop over the range of a shot fired, a specialized form of projectile may also be used, which eliminates or greatly reduces the increasing rate of bullet drop over the flight path of most ballistic projectiles unpowered during some part of flight. Specifically, such a projectile includes lift-creating elements, at least one of which creates a drafting effect on another element, blocking or reducing some of the lift-producing airflow on that another element. As the projectile experiences drag in flight, and reduces its speed, at later points in its flight, the influence of gravity is more greatly offset in such a projectile, by increased airflow and lift on that another element. To maintain fixed, as opposed to spinning, airflow elements, an internal gyro aspect, which may spin within a housing including such airflow elements, may be included, which gyro may be caused to spin by a rifling or other spin-inducing element of the firing mechanism and/or projectile, increasing the projectile's stability. For rifling to induce such spin, access port(s) and/or access grooves in the housing may be included, allowing rifling to engage the gyro unit, or some tab or aspect thereof, to cause it to spin, while straight-line leveling grooves engage the lift-producing elements, or another housing element, to produce rotationally stabilized, or level flight in the housing.

Turning back to the embodiment illustrated in FIG. 2, the user may next choose to "set" the location of the point of impact indicated by the point of impact indicator, for example, using the impact point set button 225. If so, the current location of the point of impact and its indicator (relative to the target environment, or represented target environment) would become fixed, in some embodiments, with reference to the shooting subject- or system-surrounding environment. In some embodiments, the current location of the point of impact and its indicator may become fixed on the target, even if it moves, by tracking and location projection hardware controlled by the control system unit 217. In some embodiments, such tracking is aided by "painting" the subject with an electromagnetic beam generated by beam projection hardware controlled by the control system unit 217. In other embodiments, such tracking is aided by another tracking, projection or intercept hardware or methods. In some embodiments, such hardware may be external to, and in a position different from the remainder of the targeting system (e.g., within a reconnaissance drone or satellite, or landed sensor). As mentioned above, some of those tracking methods are treated in greater detail below, in reference to FIGS. 8 and 9. However, because the point of impact and its indicator(s) has been placed in an off location, due to user and/or environmental factors, the user may instead wish to cancel the point of impact and its indicator(s), using a point of impact cancellation button 227. In some embodiments, depressing point of impact cancellation button 227 returns the system to the state shown in FIG. 1, such that the user can again attempt the correct placement of a point of impact and its indicator on the target. Alternatively, the user may instead tweak the placement of the point of impact to further set it, by using point of impact vertical and horizontal adjustment controls, such as vertical point of impact location adjustment knob 245 and horizontal point of impact adjustment knob 247, respectively, to better set the location of the point of impact and its indicator(s). In some embodiments, depressing the point of impact cancellation button 227 at any point may reverse the previous step entered by the user in the system, even if the previous step was not creating or setting a point of impact and its indicator(s). Supposing that a user has not depressed the point of impact cancellation button 227, the user may, for example, turn the vertical point of impact location adjustment knob 245 clockwise, causing the control system unit 217 to adjust the point of impact and its indicator downward, and may turn the horizontal point of impact location adjustment knob 247 clockwise, causing the control system unit 217 to adjust the point of impact and its indicator rightward. The user may continue making such adjustments, or counter-adjustments, until the point of impact and its indicator(s) are located and displayed by the control system unit 217 and its connected display at the same vertical and horizontal position the target.

Assuming that the user has successfully created a point of impact and its indicator(s) on or near the subject, as desired, using the steps and adjustment process discussed immediately above, the figures below address further aspects of the present invention.

Figure 3:
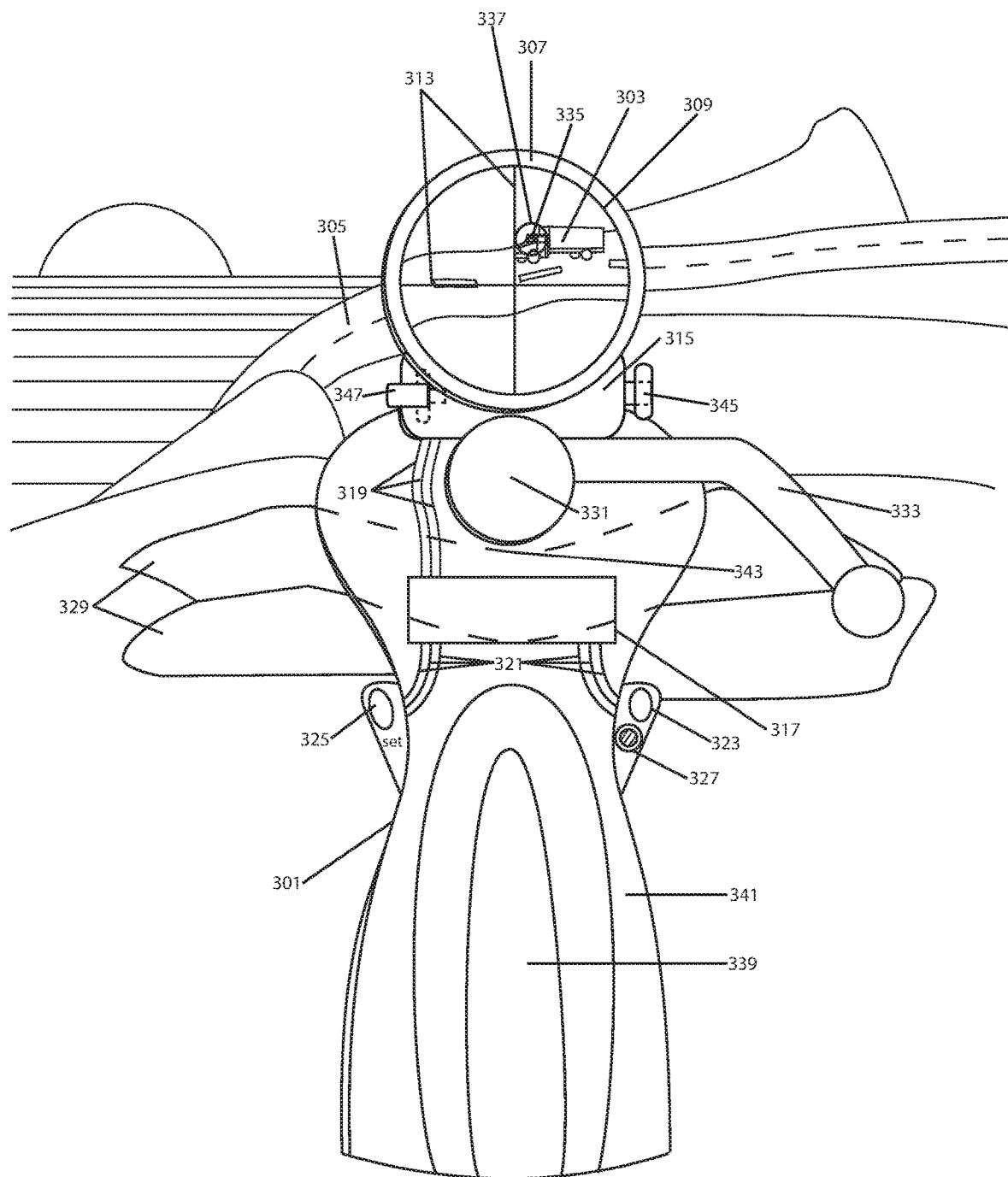

FIG. 3 is another illustration from the user's perspective of the same targeting subject, shooting environment, high-powered rifle with a telescopic sight and other aspects of a targeting system as discussed with reference to FIGS. 1 and 2, but at a later point in time, and implementing additional aspects of the present invention. In the point in time shown in FIG. 3, user and/or environmental variables have caused the rifle 301 to be further moved with reference to the target driver of truck 303. Specifically, the stock and handgrip 339 and 341 (each of which are closer to the sniper's chest and rifle-actuating hand than the pivoting point 343 of the rifle 301 on the sandbags 329 on which the rifle is resting) may have been budged slightly upward and to the right, from the perspective of the figure. That movement caused the scope, which is closer to the pivoting point of the rifle on sandbags 329, to shift its angle, and point more to the left and downward. As shown in the figure, the system nonetheless maintains the new point of impact and its indicator(s), now 335 and 337, in their set location relative to the target and/or surrounding environment, which may, as mentioned above, be accomplished with the aid of additional hardware, such as a location beacon or probe, inertial change detection or target movement and tracked position projection, or other methods of sensing the movement and the attendant change in position of the scope relative to that target and set point of impact, and moving the point of impact indicator as it appears within the scope to remain indicating its correct placement on the target, within the surrounding environment. In addition, the system may actuate the firing mechanism position (including the barrel, in some embodiments) to shift it vertically and horizontally and/or in alter its angle such that a projectile fired from the rifle would have a point of impact corresponding with the location of the new point of impact and its indicator(s), relative to the target and/or the surrounding environment also including any instantaneous adjustments necessary for any other accuracy impacting factor, as well as the movements discussed above, as may become necessary by changes or introduction of such factors. In the preferred embodiment shown in the figure, the system did not, however, completely counteract the movement using variable mounting 315 to alter the location of the scope housing and reticle and, in some embodiments, such a mounting may have restricted actuation to address certain but not all accuracy-affecting factors. In some embodiments, such a mounting may be fixed and not actuable. In some embodiments, such a mounting may be actuable only for general use and initial set-up of the scope on the rifle (which may be prior to the targeting activity, and therefore address general factors but not more immediate, dynamic user and environmental factors). For example, prior to training the rifle and scope on a particular subject, the user and/or system may adjust the scope using variable mounting 315 to address the influence of elevation, humidity, air pressure, and windage, but hand and body movements impacting the rifle, and even more subtle influences such as those caused by hand shake or heartbeat, and other environmental collisions with the rifle, may be permitted to move the scope generally.

Accordingly, the rifle scope, now shown as 307, generally has been allowed to shift and change its angle with the user or environmental movement discussed above, and now points, along with its reticle, downward and to the left of the subject, rather than directly at it. Nonetheless, due to the active, instantaneous maintenance of the set point of impact and its indicator(s) appearing at the location of the target, counteracting the present and/or future projected influence(s) of accuracy-affecting factors on the indicator and firing mechanism, a user firing the rifle at any time after setting a new impact point and indicator will result in firing a projectile that will accurately impact the subject location, despite those otherwise accuracy-impacting factors. By allowing rifle movement to continue moving the scope, and altering the view in the viewing portal, at the same time as maintaining the point of impact, its indicator(s), and at least part of the firing mechanism, however, the user is able to continue scanning and evaluating more of the environment, and may set additional point(s) of impact, and indicator(s) thereof, in new locations. In some embodiments, such additional point(s) of impact may be selected for a rapid, simultaneous or other pattern of execution by firing of projectiles at such additional points of impact. In some embodiments, a firearm and control system controls multiple firing mechanisms, enabling such simultaneous execution. This embodiment is versatile and timely, while maintaining high accuracy.

Some methods discussed above enable a user to, in effect, take a projected, trial shot at a subject within an environment, evaluate its effectiveness, and then execute it only if satisfied. Prior to this invention, shots needed to either succeed or fail, with one, actual take often with undesirable, irreversible consequences. Furthermore, some methods discussed above enable a user, in effect, to adjust an errant trial shot with separate controls, not subject to the vagaries of a more ordinary shooting process, and execute it once the errant shot is corrected.

In other embodiments, the scope 307 itself may continue to indicate the point of impact by moving, along with the actuated barrel, to counteract any and all user and environmental factors impacting accuracy—rather than remain fixed with respect to, and moved by, some user or environmental factors, as in some embodiments discussed above. In such embodiments, by selecting a point of impact and its indicator(s) with the aide of the system, crosshairs themselves, or some part thereof, may change shape, color, active lighting, or other indicating characteristics to signify that such a point of impact has been created. Such indicating characteristics, but of a different nature, may separately indicate additional point(s) of impact and the setting or priority status(es) thereof (for order of execution by the system), and additional reticles may also be added, to address those additional point(s) of impact and their indicators, in which case the scope may follow (centered on) the latest new point of impact and its indicator, or highest priority point of impact and its indicator(s), with a corresponding reticle, instead of or in addition to another point of impact and its indicator or component thereof, such as those discussed above, unless and until the setting of another point of impact has begun.

Assuming that the user has not yet executed a command to the system (e.g., by full trigger pull) to execute the point of impact that was set and shown by the point of impact indicator(s) 335 and 337, the user may, of course, cancel the point of impact or tweak its location, using the user controls as discussed above. However, the user may also choose to set an additional point(s) of impact and indicator(s), aspects of which will be discussed in greater detail with reference to FIG. 4, below.

Figure 4:
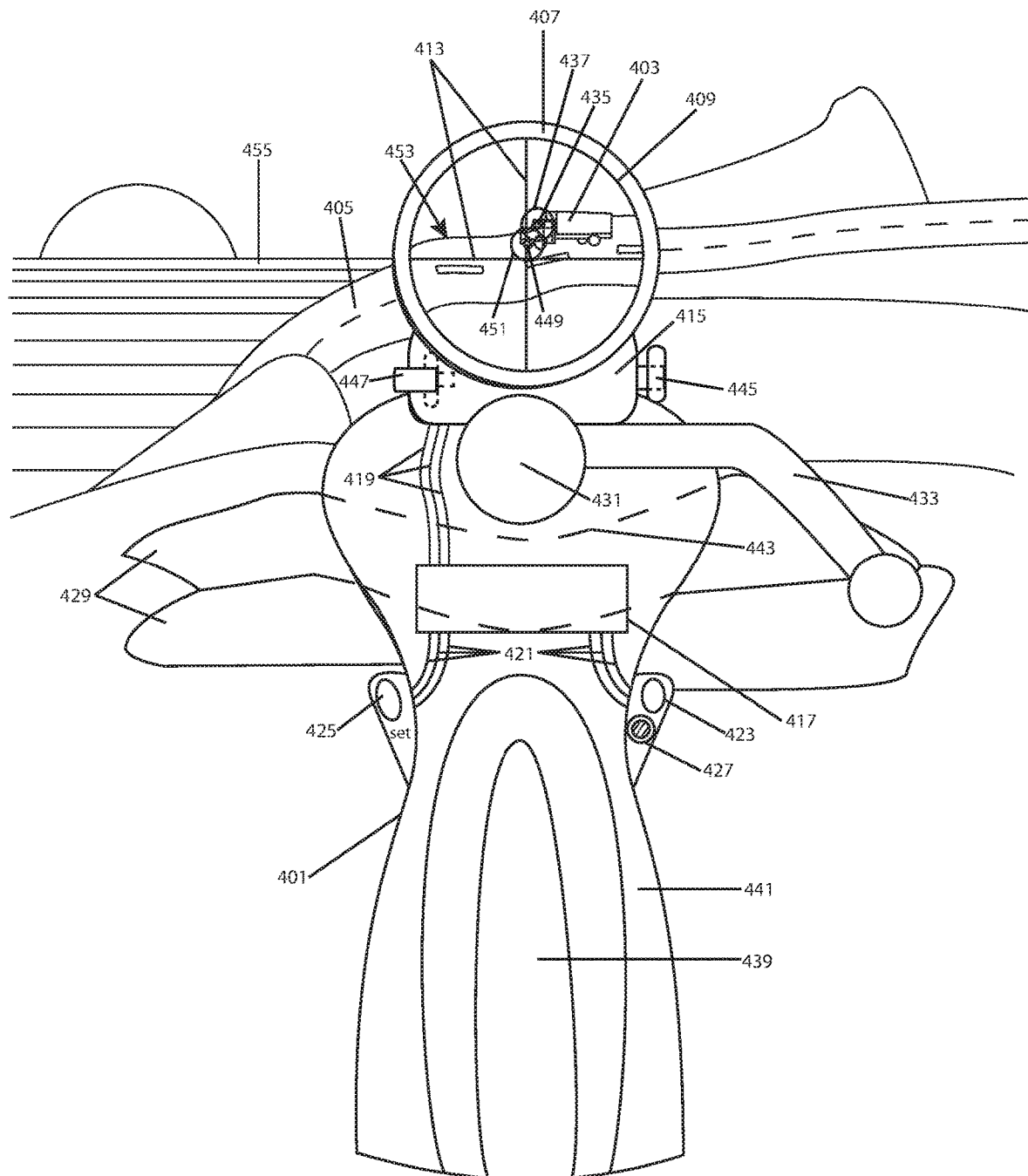

FIG. 4 is another illustration from a user's perspective of the same targeting subject, shooting environment, high-powered rifle with a telescopic sight and other aspects of a targeting system as discussed with reference to FIGS. 1-3, but at a still later point in time, and implementing additional aspects of the present invention. In FIG. 4, an additional point of impact and indicator(s) thereof have been created and set, shown by point of impact indicator dot 449 and surrounding concentric circle 451. A user has used the process discussed above, with respect to creating the previous point of impact and its indicator(s), which still exist and are now shown as 435 and 437, to create the additional point of impact and its indicator(s) shown as 449 and 451. More specifically, the user has created and set the additional point of impact and its indicator(s) at a location corresponding with a point of impact at the front, right tire of the truck 403, from the perspective of the driver, near the edge of the road 405 and a cliff 453 descending into a body of water 455.

If the user then chooses to execute one or both points of impact, the system would first cause the point of impact selected for first execution (the highest priority point of impact) to be hit with a projectile, by actuating the firing mechanism as described above for maintaining aim (including offsetting all environmental and user accuracy-impacting factors) and firing upon ("executing") that point of impact. If the user then commands the system to execute the point of impact selected for second execution (the next-highest priority point of impact), the system would then actuate the firing mechanism to cause a projectile to hit the second point of impact, e.g., by repositioning the barrel (aiming it) to do so, accounting for all factors impacting accuracy. In some aspects of the present invention, the system may rapidly execute firing upon each point of impact without pausing to allow the rifle to settle after recoil, and further counteract the impact of recoil as another accuracy-impacting factor. But in other aspects, the system may pause to allow such settling, or, at least, part of such settling, to retain firing capability within the range of possible firing mechanism adjustments. In other embodiments, the system considers movement caused by said firing to be an accuracy impacting factor, and actuates firing mechanism actuators to counteract, or reduce the effect of, that movement. Different modes may be available to permit the user to fire upon all impact points set, or to "double-tap" or otherwise produce a close grouping, coverage of possible locations of a target, or other patterns of multiple shots with an automatic rifle on or about a point of impact, or series of points of impact, which actions may be executed upon one command (e.g., one trigger pull). But serial execution (one impact point per trigger pull or other command from highest to lowest priority—which may be rearranged by the user) after recoil settling and determining that the point of impact is still within the viewing portal, which may correspond with being executable by the system, may be preferred in some embodiments, and may also be used in executing such patterns, in such embodiments.

The targeting methods and systems set forth in this application may apply equally to a wide variety of other pointing, aiming, targeting and executing activities, including, but not limited to, cameras and electronic tagging or data write/re-write activities. For example, shipment tracking systems and high-speed photography systems may create multiple targeting (other forms of impact points) for focused activities using the same types of controls and a similar GUI (e.g., photographic viewfinder rather than reticle), but for intercepting a point or area with a tracking (scanning, reading, writing) or photographic activity.

Figure 5:
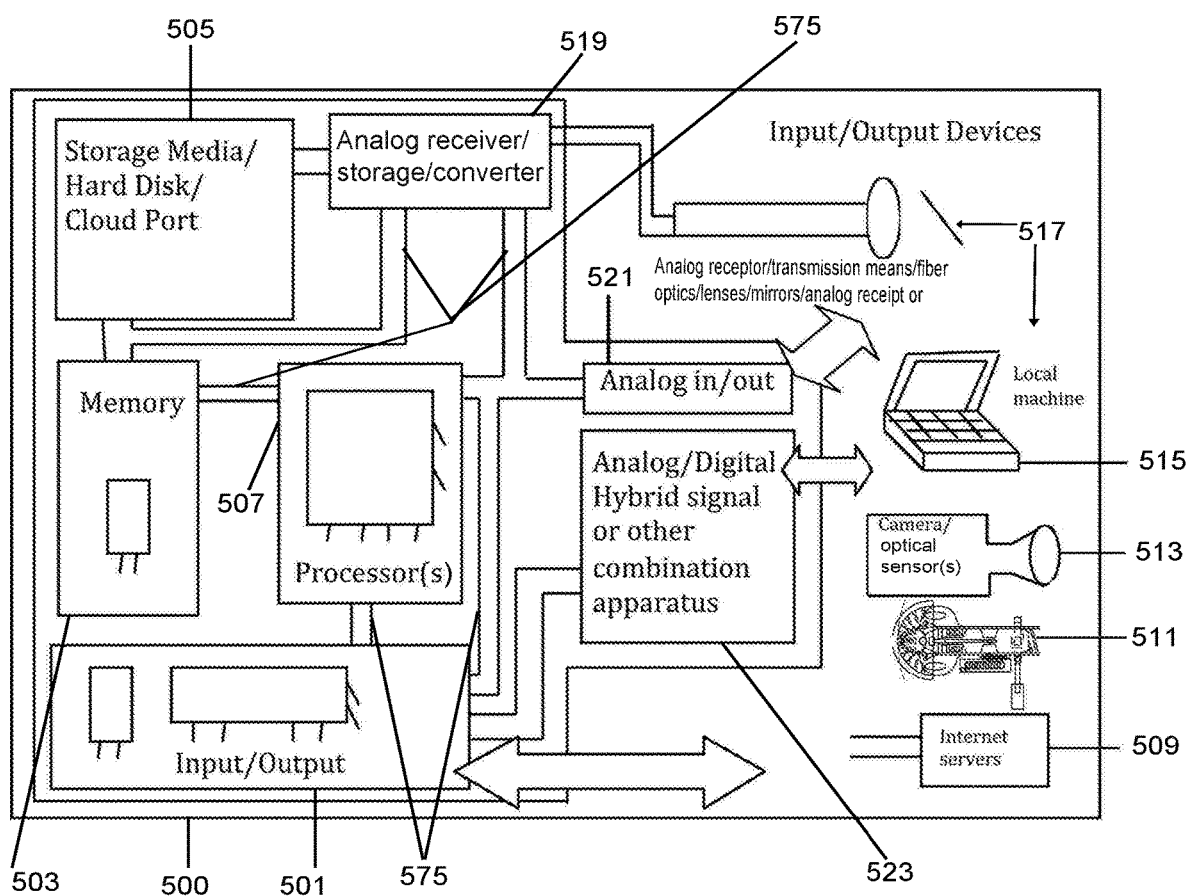
FIG. 5 is an illustration of control system, as may be used to assist in implementing some aspects of the present invention.

FIG. 5 is a schematic block diagram of some elements of a control system 500, preferably incorporating a machine-readable medium, that may be used to implement various aspects of the present invention, other elements of which are depicted in FIGS. 1-4, 6 and 7-9. The generic and other components and aspects described herein are not exhaustive of the many different systems and variations, including a number of possible hardware aspects and machine-readable media that might be used, in accordance with the invention. Rather, the system 500 is described here to make clear how aspects may be implemented.

Among other components, the system 500 includes an input/output device 501, a memory device 503, storage media and/or hard disk recorder and/or cloud storage port or connection device 505, and a processor or processors 507. The processor(s) 507 is (are) capable of receiving, interpreting, processing and manipulating signals and executing instructions for further processing and for output, pre-output and/or storage in and outside of the system. The processor(s) 507 may be general or multipurpose, single- or multithreaded, and may have a single core or several processor cores, including microprocessors. Among other things, the processor is capable of processing signals and instructions for the input/output device 501, analog receiver/storage/converter device 519, and/or analog in/out device 521, to cause a user interface to be provided or modified for use by a user on hardware, such as, but not limited to, physical human hand tracker and other human body part interface controls (e.g., 3-D hand sensor, object emulator, joystick control, sight or scope adjustment dials) and/or a personal computer monitor or terminal monitor with a mouse and keyboard and presentation and input software (as in a GUI), rather than or in addition to electronic/photonic scope or sight aspects, as discussed in reference to other figures in this application.

For example, a "window" presentation user interface aspect may present a user, such as a sniper or other firearm user, with a reticle and/or environmental image, remaining scope readouts or display output, with selectable menu options in a GUI, to select settings for targeting and execution, such as creating, cancelling and adjusting new points of impact or the counteraction or other treatment of factors impacting the accuracy of a firing mechanism (e.g. by actuating firing mechanism actuators that control the position of at least part of a firing mechanism), as discussed in greater detail elsewhere in this application.

As another example, such a "window" presentation user interface aspects may present a user with the option to target or gesture with respect to particular locations of visual emulations of a model or photographic subject, based on live feedback, such as imaging and the detected movement of painted or edge/boundary detected targets within a collateral medium or material. As mentioned above, a wide variety of sensors or auxiliary probes may be used to aid in detecting, defining and even imaging targeted objects or parts thereof ("targets"). As another example, the user interface and hardware may allow a user to manipulate a virtual object that may translate movements into control input matching or related to those movements in real time, and with reference to a live model depicted on a computer monitor and presenting instantaneous information from a radar or sonar or Nuclear Magnetic Resonance Imaging ("MRI") or X-ray radiographic (e.g., CAT scan) machine, which may allow a user to create an activity or apply physical force or energy to particular areas of a target, in particular series, locations, shapes and sizes or pulses and pulse rates to substantially cut or ionize matter, which size and shape may be given a hardness of edge, tolerance, and strength, all individually controllable by a user, and which may be provided as feedback to the user by acceleration of the virtual object, either by an actuable effigy of the shape, size, position, resistance and weight of the virtual object and its controls, or by tactile stimulus (e.g., ultrasound and/or radiative feedback). A virtual object or other ionizing tool may include a shaped cursor which may be semi-transparent, and may allow the user to plan and view a portrayed path for the planned future ionization or other, for example actual, robotically actuated physical movement, such as surgical lancing or other subject manipulation, before it is actually implemented on a subject (which execution can be done in parts or degrees or completely, with a separate, later command to the system). This manipulation path planning may be done with a cursor or other display, such as a computer monitor, or depiction/control hardware and techniques (e.g., 3-D physical contour, camera array projection, cutting, shipment tracking plan, or manipulation emulation device). In any event, a user may create a path of planned movement, shooting or a shooting series, tracking protected subject location or path intercept or other activity or other manipulation by programming such a path and/or by first executing the path in virtual or real space and, optionally, reviewing a depicted path based on that execution, and, if satisfied with the characteristics of the movement(s) of the executed path (e.g., direction(s), length(s), instance(s), location(s), coverage(s), breadth(s), pressure(s), actual or real tissue reaction(s), size(s) of lancing or projected lancing, or blunt instrument trial or projection of where lancing or other actuation will take place), all of which characteristics may be displayed numerically or graphically as an attribute of a depicted path in a display as a "Planned Path," representation, the user may then choose to have the path executed. Optionally, before choosing to execute the path, the user may choose to save a file composed and capable of executing the characteristics of the movement on the system. Also optionally, the user may elect to modify individual, several or all characteristics of the path over any part of the path's progression (for example, by creating or manipulating segmentation tools such as anchor points along the path), again may choose to save such a file comprised of such information, and again may choose separately to execute the path, which may be executed at different speeds along the path or even with a graduated and/or matched acceleration device, such as a throttle for the path's execution speed (using any possible units/time) which may be stopped at any time during observation of the movement. The system may automatically, or at the user's direction, adjust the path or path segments for unintended hand tremor by smoothing or substituting more graduated curves and movement accelerations along progressions or as to characteristics of the path. The system may automatically, or a user may direct it, to generate reactive or protective radiation in greater, lesser or other amounts that better interfere and protect against ionizing radiation, for protected collateral areas, as well, as another example, based on live feedback concerning the amount of protection actually occurring through interference, as sensed by the system, and/or based on physical models, including refraction models.

The processor(s) 507 is/are capable of processing instructions stored in memory devices 505 and/or 503 (or ROM or RAM), and may communicate via system buses 575. Input/output device 501 is capable of input/output operations for the system, and may include and communicate through numerous input and/or output hardware, and numerous instances thereof, such as, but not limited to, a computer mouse, touch screen, flat panel display, collimating light-augmented scope, and pixel arrays, including a pixel array with differently addressable and separately (or in any progressive or other sub-group) scannable and projectable pixels, system element position sensors and actuators (as in 511, which may be the system described in FIG. 6, but should be understood to include such actuators and sensors for carrying out the capabilities described aspects of the invention described in that figure), firing mechanism position sensors and actuators (also as in 511), MRI machine, X-Ray radiography device, robotic actuator(s), magnetic field creators or modifiers/oscillators (and magnetically-actuated, locatable particles, such as nano-particles, or manipulation devices that are systemically or locally available in patients, e.g., nano-particles with abrasive surfaces that may spin, expand, grab, cauterize through electric charge, in an oscillating magnetic field and that may also react to markers on targets, available through injection into the patient), communications antenna, electromagnetic radiation source(s), keyboard, networked or connected second computer, camera or scanner, a multi-tiered information storage device (including its actuators and read/write apparati), mixing board, real-to-real tape recorder, external hard disk recorder, additional movie and/or sound editing system or gear, speakers, external filter, amp, preamp, equalizer, computer display screen or touch screen. It is understood that the output of the system may be in any perceptible form. Any such display device or unit and other input/output devices could implement a program or user interface created by machine-readable means, such as software, permitting the system and user to carry out the user settings and input discussed in this application. 501, 503, 505, 507, 519, 521 and 523 are connected and also able to communicate communications, transmissions and instructions via system bus(ses) 575. Storage media and/or hard disk recorder and/or cloud storage port or connection device 505 is capable of providing mass storage for the system, and may be or may include a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive. Generally speaking, the system may be implemented as a client/server arrangement, where features of the invention are performed on a remote server, networked to the client and made a client and server by software on both the client computer and server computer.

Input and output devices may deliver input and receive output by any known means, including, but not limited to, the examples shown with respect to examples 517. The input managed and distributed by the system may be any representational aspect or signal or direct impression captured from any sensed or modeled activity, and may be taken or converted as input through any sensor or carrier means known in the art. In addition, directly carried elements (for example a light stream taken by fiber optics from a view of a scene) may be directly managed, manipulated and distributed in whole or in part to enhance output, and whole ambient light information may be taken by a series of sensors dedicated to angles of detection, or an omnidirectional sensor or series of sensors which record direction as well as the presence of photons sensed and/or recorded, and may exclude the need for lenses (or ignore or re-purpose sensors "out of focal plane" for detecting bokeh information or enhancing resolution as focal lengths and apertures are selected), only later to be analyzed and rendered into focal planes or fields of a user's choice through the system. For example, a series of metallic sensor plates that resonate with or otherwise detect photons propagating in particular directions would also be capable of being recorded with directional information, in addition to other, more ordinary light data recorded by sensors. While this example is illustrative, it is to be understood that any form of electromagnetism, compression wave or other sensed phenomenon may include such sensory, directional and 3D locational information, which may also be made possible by multiple locations and/or angles of sensing, preferably, in a similar or measurably related, if not identical, time frame. The system may condition, select all or part of, alter and/or generate composites from all or part of such direct or analog image transmissions, and may combine them with other forms of image data, such as digital image files, if such direct or data encoded sources are used. Specialized sensors for detecting the presence of interference or resonance of radiation of any type, and imaging the sources or capturing the forces applied based on the known characteristics of waves and electromagnetic radiation in particular, may also be included for input/output devices. Sensors that permit the biangulation or triangulation of light sources, to determine subject and subject environment location and range information, may also be used, and the system may "paint" any part of that subject or environment with electromagnetic, radiative heating, or other markers to ease tracking, targeting, and counteracting environmental/system relative shifts and rotations with the further use of sensors detecting such markings, as discussed in other parts of this application. A direction-indicating beacon may also or alternatively be planted in the surrounding environment to ease these system activities and general system position and subject tracking assessment, including, but not limited to, subject, target and system position projection, in the environment. In this way, impact points may be placed and maintained relative to the subject itself, if marked, or the environment in general.

While the illustrated system example 500 may be helpful to understand the implementation of aspects of the invention, it is to be understood that any form of computer system may be used—for example, a simpler computer system containing a processor for executing instructions and a memory or transmission source. The aspects or features set forth may be implemented with, and in any combination of, digital electronic circuitry, hardware, software, firmware, or in analog or direct (such as light-based or analog electronic or magnetic or direct transmission, without translation and the attendant degradation, of the image medium) circuitry or associational storage and transmission, as occurs in an organic brain of a living animal, any of which may be aided with external detail or aspect enhancing media from external hardware and software, optionally, by networked connection, such as by LAN, WAN or the many connections forming the internet. The system can be embodied in a tangibly-stored computer program, as by a machine-readable medium and propagated signal, for execution by a programmable processor. The method steps of the embodiments of the present invention may be performed by such a programmable processor, executing a program of instructions, operating on input and output, and generating output. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 6:
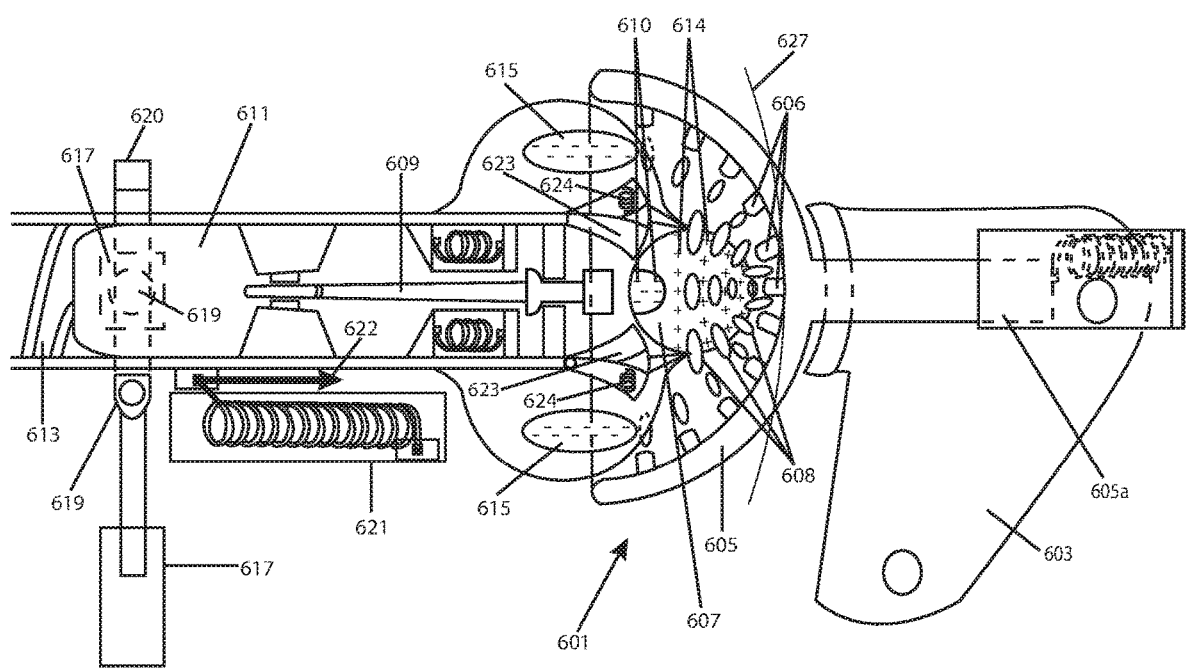
FIG. 6 is a cross-sectional illustration of an exemplary system comprising a 3D position-adjustable firing mechanism for a firearm, as may be used to implement various aspects of the present invention.

FIG. 6 is a cross-sectional illustration of an exemplary system comprising a position-adjustable firing mechanism 601 for a firearm, as may be used to implement various aspects of the present invention. The cross-sectional plane is vertical and bisects the barrel and remaining firing mechanism as they would appear if the firearm in which they are installed was in firing position, as shown in FIGS. 1-4, creating a view of the right-hand side of the two bilaterally identical halves of the barrel and each other firing mechanism component, with the exception of one component, (a spherical striker, 607) to ease its presentation, is a simple side-view of that part.

A hammer 603 may be included and may be force-biased and caused, upon a shooting execution movement (which may be electronically commanded and/or physically caused) to release stored energy from that force biasing and strike a preferably semi-spherical concave intermediate gear 605 which is physically interfaced with an abutting convex curved, and preferably spherical, striker 607, via gear teeth, such as those shown as 606 and 608. A firing operation embodiment, using the firing mechanism described in this figure, is as follows. When stricken by intermediate gear 605 (itself stricken by hammer 603), striker 607 then, in turn, strikes firing pin 609, which may strike a loaded cartridge (not pictured) held in chamber 611, resulting, for example, in igniting an accelerant and causing a projectile within the cartridge to fire down a rifled barrel 613. Preferably, the magnetic material creating the dipole in spherical striker/gear 607, and shown by groups of negative and positive signs (discussed further, below, and such as those negative and positive signs appearing as, respectively, 610 and 614) is sorted, maintained or reinforced in its dipole position by the striking action—for example, by a heavier positive side of dipole elements.

Any number of physical and electronically mediated, systematically controlled trigger and firing mechanisms may also, or alternatively, be used, to implement various aspects of the present invention. But preferably, a mechanism, which may change the rotational position as well as horizontal and vertical position of at least the firing barrel component of the firing mechanism is used. In the preferred embodiment detailed in FIG. 6, the rotational angle of the barrel may be altered in unlimited degrees by the rotational actuation of spherical striker 607, which, owing to its electromagnetic dipole, may be rotated without structural contact by electromagnetic actuators 615, which are controlled by the control system. Actuators 615 are shown in the figure with equal net negative charges, leading to stabilizing force on the balanced (unrotated) position pictured of striker 607. Additional sensors (not pictured) may relay rotational position and/or other barrel position data, or data from which rotational position may be extrapolated, back to the system, to aid in the system's determination of rotational angle and other barrel position adjustments that will result in a point of impact of a projectile corresponding with an indicated impact position selected (given highest priority) for firing. By causing striker 607 to rotate (in any spherical rotation direction and amount of rotation dictated by the system) omni-directionally operating gear teeth, such as those pictured as 608, of striker 607 interface with complementary omnidirectional gear teeth, such as those pictured as 606, of intermediate gear 605, the system may control and adjust the barrel rotational position by unlimited degrees, in 3 dimensions, as well as slightly shift the barrel fore and aft in the directions of its length, and move the end of the barrel upward and downward, by various degrees. As striker 608 rotates, and its teeth 608 interface with and climb the teeth 606 of intermediate gear 605, the side of the barrel proximal to hammer 603 moves horizontally, vertically and by rotational position. Servo/motor actuable (e.g., by solenoid) barrel movement pistons 617 are mounted to the body of the rifle and connect to the barrel by rotatable (preferably, hinged) bracing joints 619, which may connect with the barrel by a ring-shaped clasp 620, in which the barrel fits but, in some embodiments with fore and aft barrel movement, may slide and rotate (e.g., with the use of sprung bearings or a gasket), as necessary, fore and aft to accommodate rotational and shifting movement of the barrel, further enabling rotational and horizontal and vertical barrel movements and at least semiautomatic or bolt action chambering of new rounds using barrel recoil, gas compression, electronic actuation of actuators or manual bolt operation (each such action is not pictured). Joints 619 and clasp 620 preferably hold the barrel and/or attached chamber and firing pin and its housing from a location or point on the length of the barrel more distal from the hammer end than the spherical striker, or other rotational direction actuation driver. As another example of a rotational actuation driver, a set of two or more separately actuable pistons (not pictured), similar to pistons 617 but to the right of pistons 617, from the perspective of the figure, and also connected to a clasp by rotatable bracing joints, may drive the position of the proximal end (facing the hammer) vertically and/or horizontally in varying degrees and, in conjunction with fixation or coordinated actuation of pistons 617, may yield a wide variety of rotational, horizontal, vertical positions of the barrel, as dictated by a control unit of by the system. Another such piston may be used, but mounted for fore and aft shifting actuation of the barrel, to accomplish different fore and aft shifting of the barrel. But in combination, pistons 617 (with their slidable attachment joint 619) and spherical gear striker 607 (or the alternate piston embodiments discussed immediately above) permit the system to adjust the barrel to modify shot elevation, lateral position, and bullet path—and each of those types of movements separately or together. In this way, ballistic equations may be dealt with more easily by the system, by isolating variables for alteration, rather than with more complex ballistic equations. In the context of applying a similar mounting for 3-D photography, various angles may be acquired for a photographic subject from one lens, which may be mounted as the barrel is in this example to aid in rapidly acquiring and executing such shots. In another, simpler embodiment, but without all of the firing mechanism positioning capabilities, a single set of pistons, or other positioning actuators (such as those incorporating servo/motors and solenoids) such as those shown as 617 may be used, in conjunction with a rotatable joint, pocket, pivoting point or other physical rotation point (which need not be separately actuable by the system) may be used in place of the spherical gearing, to accomplish some rotational actuation and even some horizontal and vertical shifting of the barrel, as may be dictated by the system. A wide variety of other rotational and position actuation mechanisms and feedback, including purely electromagnetic actuation, may also be used, though the embodiments discussed are preferred due to the high cost of such purely electromagnetic actuation of all elements, given the high current cost of moving and holding heavy weapons firing components electromagnetically. In the photographic application of the invention, however, more or purely electromagnetic actuation and feedback, such as that discussed for spherical striker 607, may be preferred for all actuators.

Force-loading structure 621 connects the body of the rifle and barrel, and applies force to the barrel in the direction indicated by force-indicating arrow 622, driving and seating the barrel and connected chamber, firing pin 609 and, most immediately, spherical gear striker 607 into gear 605. Straight-line moveable, piston-action mount 605a connects gear 605 to the body of the rifle, providing a secure platform and also applying reacting force in the direction opposite to force arrow 622 to aid in maintaining strong gear teeth interface for gear 605 and striker 607, by pushing them together. In alternate embodiments, the hammer element may be omitted and the piston 605a or other striking actuator may itself provide striking force to gear 605, striker 607 and/or firing pin. In this instance, a specialized piston and actuably-rotating armature also may be used, which allows the striking force to be generated in any direction, and more perfectly oppose (be generated 180 degrees from) the barrel and chamber direction, however it may be rotationally actuated at the time of striking—moving gear 605 in a straight-line path direction perpendicular to the tangential plane at the central point of the spherical gear interface. A semi-spherical gear such as 605 with a spherical center located at the distal rotational pivot point of the barrel may, instead, be used (as pictured by alternate gear inner surface shape, teeth omitted, shown as 627), which may aid in creating even opposing force as the gear is actuated. But in that case, the capability for fore and aft shifting of the barrel during rotational actuation will be eliminated unless an additional piston or other actuator for creating for and aft shifting of the barrel and firing mechanism is used. Alternatively, or in addition, uneven gear teeth angles and thickness may be used, as pictured, to create approximately stable striking force at the point of striking, opposing the direction of the barrel and chamber, for any possible point of spherical gear interface. In any event, the system may use a final (firing strike completed) barrel position, to whatever degree the barrel may shift in each rotational position due to striking action, in determining the nature and degree of barrel position actuation to result in hitting the highest priority impact point with a shot. To allow piston 605a to operate at a radially-centered attachment point, hammer 603, if used, may contain a central slot or cavity, or be comprised of two striking pieces, between which such a piston is seated. If the hammer is omitted, an actuable striking force exerter may be connected directly to the barrel and/or striker and/or firing pin, and spherical gearing may be implemented without a spherical gear also serving as a striking or strike-transmission element, as it is in the figure. However, such an embodiment may be more expensive to implement, as it would require electrical or more complex mechanical striking assembly, to allow changing barrel position and still exert a sufficient striking force at all such positions.

Turning back to the embodiments shown in the figure, variable striker holders 623 may prevent firing pin actuation until a firing execution is commanded or carried out—serving as a safety and gear engagement maintenance device. For example, holders 623 may retract into pockets 624 by a system or user electronic command or actuation signal, or simply by being overcome by the force of a hammer strike from hammer 603, toward the spherical striker 607. Alternatively, as discussed above, hammer 603 may be omitted, and straight-line only movable piston mount 605a may itself be system- or firing movement-actuable to strike spherical striker 607 and overcome the holding force of holders 623.

Figure 7:
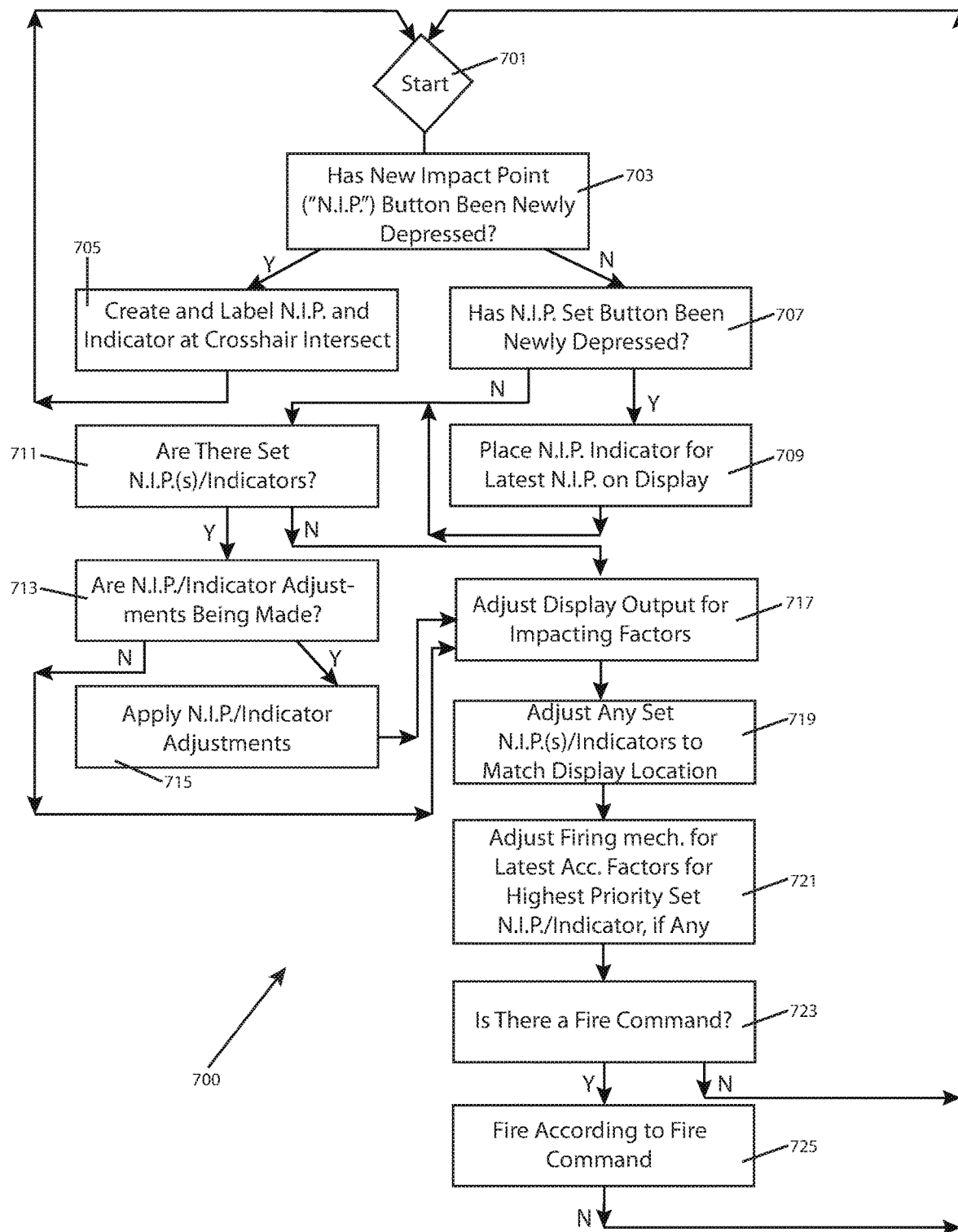
FIG. 7 is a process flow diagram for exemplary steps that may be taken by a system, such as a hardware and software system, implementing aspects of the present invention.

FIG. 7 is a process flow diagram for exemplary steps 700 that may be taken by a system, for example, a hardware and software system, such as the system discussed above with reference to FIG. 5, implementing certain user interface and display aspects of the present invention. In step 701, the process begins and proceeds to step 703, in which the system receives or consults any sensor-transmitted or stored data indicating whether a new impact point ("N.I.P.") button has been newly depressed (meaning that the system has not already taken action on such a depression), such as, for example, the button given as 123, 223, 323 or 423 of FIGS. 1-4. If so, the system proceeds to step 705, in which it creates a point of impact (for example, by storing its coordinates and readying the firing mechanism to aim a projectile at a location corresponding with those coordinates at any time a firing command is given) and its visual indicator(s) as discussed elsewhere in this application. As step 705 and other steps indicate, it is preferred that unless and until this N.I.P. and indicator have been "set" it remains pinned to the intersection of the crosshairs of a reticle (or otherwise in an easily-referenced user-movable position for unset N.I.P.s and indicators within a sight or display, depending on the embodiment chosen). Accordingly, after creating an N.I.P. and indicator, and placing them in the center of the crosshairs for further procedures, the system returns to the start position, 701. If at step 703, however, the system determines that the N.I.P. button has not been newly depressed, the system proceeds to step 707, in which the system receives or consults any sensor-transmitted or stored data indicating whether an N.I.P. "set" button has been newly depressed, such as, for example, the button given as 125, 225, 325 and 425 of FIGS. 1-4. If so, the system proceeds to step 709, in which the system places the N.I.P. and indicator in a set position relative to an observed or representatively displayed target and/or surrounding environment, in the displayed output of a sight (and preferably, the last of these options, because the system may then use inertial indicators such as accelerometers only, and therefore may be cheaper and more practical for use by a sniper). To define targets (such as targeted objects, in some embodiments), if implemented by the system, the user and/or system may identify and/or define subject objects and/or boundaries, colors, shading, or other properties thereof—automatically, or by "painting" or otherwise marking, monitoring (e.g., by comparing live attribute data to data associated with physical models of a subject, and perspective view or other subject attribute information), tracking (same) or indicating them—as discussed elsewhere in this application. In some embodiments, the system maintains a library of objects, or object types, and matches objects scanned in the environment to such objects. For example, in some embodiments, the system may perform confidence-interval matching to determine a likelihood that a scanned object in the environment matches an image of an object stored in that library. Furthermore, in some embodiments, the system may maintain a map of targets within such images of objects. In some such embodiments, the system also maintains classifications of each of such targets, and differently conditions the priority of points of impact corresponding with those targets and classifications. For example, images of human bodies may be maintained in such a library, as well as the location of lethal and non-lethal firearm shooting targets within those images. By matching such images to scanned objects in the environment, such as a real human being, lethal and non-lethal targets may be extrapolated and mapped onto the scanned objects. In some embodiments, points of impact created that correspond with the mapped locations of non-lethal targets may be given a higher priority than points of impact created that correspond with mapped locations of lethal targets and, thus, may be executed earlier by the system. In some embodiments, different projectiles or other measures may be fired at, or otherwise delivered to, points of impact within targets, depending on such classifications of mapped locations. Also as discussed elsewhere in this application, a physical probe or other non-lethal element may be introduced into the target environment or even attached to the target or an object attached to the target, to define the relative position of the target and an impact point set by the system. As yet another example, additional cameras or other imaging apparatuses (e.g. implementing LIDAR) may aid in range-finding for a target object and its surrounding environment. Such apparatuses may be located anywhere (e.g., aboard fixed positions, motor vehicles, satellites or aircraft), and made a part of the system by wired or wireless networking. Whether or not subject definition is used, preferably, the system actively maintains the N.I.P. and indicator in the position relevant to the embodiment (again, preferably, with respect to the surrounding environment of the system), such that it represents a point of impact of a projectile if fired by the system, from the targeting sight/ display perspective of a user of the system, at all times after being set, regardless of system movement, as long as the indicator remains within the view of the sight or display as it, and its matching representation, if applicable, is positioned. Also preferably, if a representative or displayed sight output is used to represent the target subject and/or environment surrounding the N.I.P. and indicator, the system also maintains an accurate representation of that environment in real time, matching the actual user and system view perspective of the actual subject and environment, and, in some embodiments, implements a margin around the N.I.P. and indicator that may be user- or system-variable. To achieve such a margin during motion of the system while still tracking that system motion with an accurate view of the target environment (matching the perspective change due to the movement), the system may increase the viewing space, magnification, or create additional viewing angles ("screens," "windows" or tabs) or change focal length and/or add magnification transitions, allowing the user to assess the system movement by changed perspective of the environmental representation, while maintaining a relative indication of the position of the set N.I.P. and indicator. Prior to setting an N.I.P. and indicator, however, in any embodiment's environmental view, changes to match the actual or selected user and/or system view perspective of a subject and/or environment would be made. Also preferably, adjustments to the firing mechanism are also made in real time, to maintain a point of impact of a projectile, if fired, coinciding with the location of an N.I.P. and indicator assigned the highest priority for firing, by the user or system. Rather than have real-time adjustments to the firing mechanism, environmental perspective and set N.I.P. and indicator displayed, however, the system may periodically correct the environmental and/or subject view perspective displayed, and the displayed set N.I.P. location, as will be discussed in greater detail below.

If the system has placed a set N.I.P. indicator for the latest set N.I.P. on the display within a view or representation of the target environment in the sight, according to step 709, or, instead, determined that the N.I.P. "set" button was not depressed, the system may proceed to step 711. In step 711, the system determines whether any N.I.P. indicators have been set by the system, including such indicators that may have been set prior to the possible instance discussed above. If so, the system may proceed to step 713, in which it determines whether N.I.P. adjustments are to be made, for example, based on user input adjusting the position of a set N.I.P., such as by horizontal and vertical position adjusting knobs 247 and 245, from FIG. 2, which may also be axially depressible such that a user may toggle between set N.I.P.s and indicators for adjustment and priority rearrangement, which may also be by separate controls. If such adjustments are being made, the system implements such adjustments by moving the relative position or altering the priority of the N.I.P.(s) selected for adjustment (which may also or alternatively be by any other practical method of object selection and movement in G.U.I.s). Whether or not adjustments have been implemented, the system then proceeds to step 717, in which the system may adjust display output to accommodate any shift in position, range, magnification, perspective, settings, sight movement, or any other factor impacting the accuracy or usefulness of representation of the targeting subject and/or target-surrounding environment represented by the display, relative to the viewer's or system's perspective. The system then proceeds to step 719, in which it further determines and implements necessary adjustments to represent the N.I.P. by an indicator in the set location for any set Impact Point within that environment or relative to a targeting subject. As mentioned above, various additional techniques may be implemented to maintain a representative view or other awareness of the targeting subject location, target-surrounding environment and a view of the N.I.P. and indicator.

The system then proceeds to step 721, in which it determines and implements necessary adjustments, as discussed elsewhere in this application, to the firing mechanism such that a projectile fired from the firing mechanism will place a projectile on, or as near as possible to on, the location of any set N.I.P. and indicator with the highest priority within the surrounding environment. If there is no currently set N.I.P. and indicator, the system may treat the intersection of the crosshairs or other reticle or impact point display point, as a set N.I.P. and indicator with the highest priority, and implement the adjustments to the firing mechanism discussed immediately above, with respect to step 721. The system then proceeds to step 723, in which it determines whether a firing command has been given by the system or user. If so, the system causes the firing mechanism to fire. If not, the system returns to the starting position.

Figure 8:
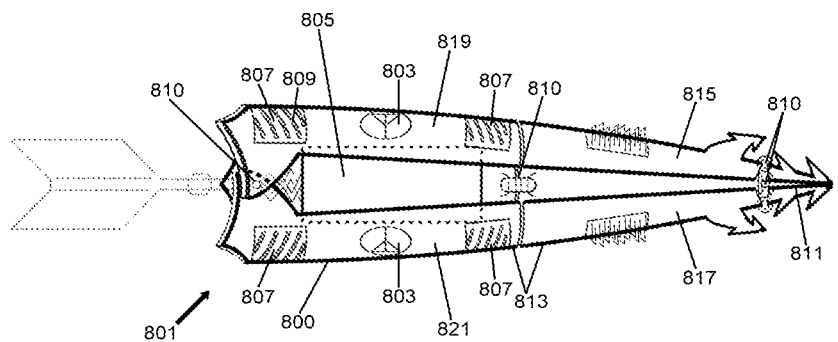
FIG. 8 is a bottom-view of an exemplary projectile which, when launched into a target, serves as a relative location and orientation determining probe, in accordance with aspects of the present invention.

FIG. 8 is a bottom-view of an exemplary projectile 801 which, when launched into a target, serves as a relative location and orientation determining probe, in accordance with aspects of the present invention. As with other projectiles discussed in the present application, projectile 801 comprises an outer surface, 800, which is generally streamlined in shape. However, outer surface 800 comprises movable components and joints that react in particular ways when projectile 801 is launched and embedded into a target material. More specifically, surface 800 comprises an exemplary seven (7) moving outer surface components, as well as several other internal moving components, held within surface 800. The exact number and positioning of the components, while useful, are illustrative and not exhaustive of the many different numbers and orientations of surface components. (An exemplary deployed positioning of such components of surface 800 is illustrated in greater detail in FIG. 9, below.) It should also be understood that moving components may be omitted, while still carrying out the tagging, location and orientation aspects of the present invention. Such moving components aid, however, in projectile flight, mounting and signaling to an external control system (such as control system 117, and as set forth above in reference to FIG. 5, which may or may not be comprised in or, alternatively, comprise the targeting systems set forth above in FIG. 1 et seq.), which is capable of communications with projectile 801. To aid in such communications, projectile 801 preferably comprises wireless communications antennae 803, connected with and able to communicate with both an external control system, as discussed above, and, in some embodiments, an internal control system 805, resident in projectile 801. Because projectile 801 comprises multiple antennae, each may indicate its own position, allowing a control system to determine the position of each component comprising each antenna and, therefore, the relative orientation of each component, with respect to each other and a corresponding receiving antenna located on the external control system. For example, by receiving different signals at different angles of propagation, and arriving at different times from each antenna 803, the external control system can assess the relative distance and orientation of each such component, and of the projectile in general. In some embodiments, projectile 801 may, alternatively or in addition, comprise electromagnetic reflectors or transflectors 807, which may reflect probing or otherwise testing signals issued from the external control system. As with antennae 803, reflectors 807 may reflect such test signals at different angles and at different distances, and also with different identifying characteristics, by each reflector selectively absorbing and reflecting different components of the test signal. For example, a different resonant or retro-reflective mesh or other material 809 may be present in each reflector and/or a differently-angled or varying-depth slit covering them may selectively block different amounts and components of the test signal—as well as reflecting differently depending on the degree to which the components have moved during deployment, indicating the degree and position of surface components during deployment.

To allow such movement of surface components, each component may be connected to the remainder of projectile 801 by hinged joints, such as the examples shown as 810. Each of the seven components of surface 800 are visible in the figure, including a tip component 811, and three sets of one fore and one aft main body component joined together, such as the example shown as 813. Because projectile 801 has longitudinal and approximately trilateral symmetry, only two sets of fore and aft components are visible in the figure as part of the outer surface 800—namely, fore components 815 and 817, and, to which each is connected, respectively, aft components 819 and 821.

In some embodiments, the control unit 805 (if present) may comprise a number of additional subcomponents for detecting and communicating orientation, position and other factors to the external control system. For example, in some embodiments, control unit 805 comprises an accelerometer, for determining movements of probe/projectile 801, as well as its orientation and position relative to the force of gravity. The control unit may also comprise a gyroscope, which may be a directional gyroscope or gyrocompass, or a form of gyroscope otherwise re-calibrated periodically according to a reference direction. Preferably, such a gyroscope or gyrocompass is dampened from movement during deployment, to avoid miscalibration or damage during impact of the projectile. As another example, if the control unit is equipped with a G.P.S., or (for example, with its wireless communications antenna(ae) 803 in communication with G.P.S. satellites), indicating its relative orientation and position, a gyroscope or the control system 805 may be periodically recalibrated to indicate a relative orientation of probe 801 with improved accuracy. Similarly, indications from an accelerometer(s) may be used to cross-check movements indicated by a gyroscope or by electromagnetic test signals of the external control system that interact with antennae 803 and/or reflectors 807 (and vice versa). As a side benefit, in some embodiments, the accelerometer(s), gyroscope(s), G.P.S. systems, reflectors and antennae may aid in directing the positioning and orientation of projectile 801 during flight, making projectile 801 a remotely-controlled projectile that can be actively directed to a particular target. For example, using a flight-simulating GUI within the external control system, or an augmented targeting GUI such as those set forth in FIG. 1 et seq., a user may select a desired target, causing projectile 801 to be directed toward it in flight, even if initially launched in a direction away from the target—for instance, by issuing a wireless signal commanding an servo 823 to bend and alter the angle of a stabilizing tail piece 825, from 180 degrees to a more acute angle in the direction of desired movement. Servo 823 may also be a rotationally actuable servo is some embodiments, allowing the user or control system(s) to maintain a desired rotational orientation during flight and deployment at a target.

As mentioned above, the dynamic operation of components of projectile/probe 801 are treated in more detail, immediately below, in reference to FIG. 9.

Figure 9:
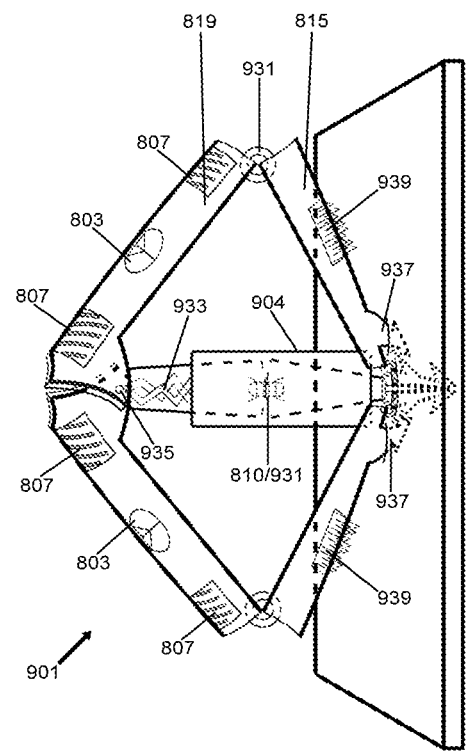
FIG. 9 is a bottom-view of the same exemplary projectile depicted in FIG. 8, in a deployed state, having been launched and embedded into a target material.

FIG. 9 is a bottom-view of the same exemplary projectile depicted in FIG. 8, now 901, in a deployed state, having been launched and embedded into a target material— namely, wall 900. As mentioned above, when projectile 801 collides with a target, its surface components shift, changing their configuration to become more spread out and rendering communications sub-components more accessible by an external control system. For example, fore and aft component pair 815 and 819 have raised upward and turned on the ring joint 931, that joins them together (as have each of the other two fore and aft component pairs. As a result, probe projectile 901 has increased its vertical profile dramatically, stretching out upward and downward. Also, the communications antennae 803 and differentiated reflectors 807 now face away from the target (approximately in the direction of the user and external control system that launched projectile/ probe 901), making them more accessible and easily differentiated being a greater distance apart in space. To aid in this spreading action, a central piston (in this case, the housing 904 of control unit 805) moves relative to the remainder of probe 901, in the horizontal direction, toward the target (such as wall 900) with which probe 901 has collided. This will naturally occur as tip 811 impacts wall 900 because the remainder of probe 901 decelerates on impact with the target, while the control unit housing 904 continues moving in the direction of the target, colliding with the inner surfaces of each surface component, spreading them outward. To enable this relative movement, a bungee cord or other elastic element 933 may be comprised in and attached to both the control unit and the remainder of the probe (in this instance, at joint axel 935), which may also comprise conductive wires for electronic communications between the control unit and its communications hardware, sensors and other components controlled by the control system. Elastic element 933 also aids in dampening and limiting that forward movement and destructive potential of housing 904, by creating a reactive elastic force opposing it.

As tip 811 collides with target wall 900 its sharp profile allows it to pierce the material of the wall and enter it. In some embodiments, a sharper or harder tip material may be used, or a larger launching force may be exerted on projectile 901, to pierce and mount probe 900 in harder, stronger, more robust or more distant materials (e.g., armor). In other embodiments, a softer material or lower launching force may be appropriate for deployment and embedding of the probe into a softer or more flexible material (e.g., clothing of a target person to be probe will be attached and tracked, and future targeting will be defined relative to, as set forth above in reference to FIG. 1 et seq.) To further aid in mounting and embedding probe 901 into its target material, additional barbed piercing connectors 937 are provided, further up the length of the forward arms/surface components, such as 815, such that they swing into, pierce and grip the material of the target as probe 901 expands. In some embodiments, other gripping connectors, such as outer members or sheets 939 comprising small hooks, barbs or microscopic cilia which may affix probe 901 to a target with van der waals forces, may also be included. These embodiments are particularly useful for attaching probe 901 and fixing it in orientation to clothing of a human target; as tip 811 pierces and more deeply anchors probe 901 into a target, additional binding forces with such outer materials is then possible. In any event, as tip 811 pierces the target, the additional piercing connectors and/or gripping connectors naturally swing forward toward the surface of the target as the surface components of probe 901 spread out upon impact and deployment, also piercing or anchoring probe 901 to the target and fixing its orientation relative to the target.

As a result, after the probe 901 is so attached to the target, and fixed in orientation relative to it, and its wireless communications antennae and reflectors become accessible to the external control system of the targeting system (e.g., such as the targeting systems set forth above, in reference to FIG. 1 et seq.), the targeting system then has a probe within the target, fixed in orientation relative to it, defining and indicating to the targeting system a set of three-dimensional coordinates defining all three dimensional space relative to the probe and the targeting system. As a result, the targeting system can set additional, more specific targets within that coordinate system (e.g., non-lethal stopping force can be applied by shots to the target, if so desired, by targeting an immobilizing but otherwise non-vital structure).

In some embodiments, additional hardware may also be included within probe 901, and controllable by internal control system 805 (which may itself be controlled by commands and communications from the external control system within the targeting system), to increase the number and variety of options for further dealing with the target. Such additional hardware may include motorized hypodermic needles with drugs held within an attached vessel (e.g., tranquilizers), electric shock-delivering devices, sound-, heat-, light- or gas-generating devices and explosives, or radio beacons, to name just a few possibilities. In some embodiments, probe 901 may include a speaker or two-way communications equipment, for issuing commands or otherwise communicating with a target.

As explained above, because projectile probe 801/901 is physically fixed in position and orientation to a target material, a targeting system employing such a projectile/probe can define relative distances and positions within said target, and a surrounding environment, with greater precision and greater control, and place or alter impact point indicators in relation to the position and orientation of projectile/probe 801/901 after deployment. Although the example of a physical, non-lethal projectile for defining relative positions of a targeting system (and positioning impact point indicators within a sight and/or display) is provided in detail, it should also be understood that any other system component or method for altering a target material, or an object attached to a target material, may also be used. For example, in one embodiment, a laser or other beam-generating sight (e.g., mounted on the body of the rifle or other launcher of projectiles to be fired by the system) comprised in the targeting system may be used, in which a collimated beam of coherent light or an electromagnetic beam is used to heat, marking, "paint" or otherwise alter a point or region of the target material or an object attached to it. Positions relative to the heated, marked or painted region or point may then be detected (e.g., by light, laser or infrared sensors within the system) to define impact points and display them to a user.

I claim:

1. A system comprising hardware configured to:
   set a location of at least one point of impact of a projectile within an environment with the aid of a sight of a firearm;
   track the location of said at least one point of impact within said environment;
   adjust the position of at least part of a firing mechanism of said firearm to reduce accuracy-impacting factors, maintaining a potential flight path of a projectile corresponding with said at least one point of impact within said environment; and
   fire said projectile along said flight path upon a command to fire said projectile at said at least one point of impact.

2. The system of claim 1, wherein said sight comprises an augmented reality display, configured to present at least one indicator in at least one location indicating said at least one point of impact.

3. The system of claim 2, wherein said at least one indicator is a plurality of indicators.

4. The system of claim 2, wherein said system is configured to cancel said at least one point of impact and said at least one indicator, based on a command.

5. The system of claim 2, wherein said system is configured to adjust the location of said at least one point of impact and said at least one indicator, based on a user-issued command.

6. The system of claim 1, wherein said system comprises a user-actuable button configured to set said location of at least one point of impact of a projectile within an environment.

7. The system of claim 1, wherein said at least part of a firing mechanism of said firearm is a barrel of said firearm.

8. The system of claim 1, wherein the system is configured to set a plurality of points of impact.

9. The system of claim 1, wherein said system is configured to set the location of the at least one point of impact based on a user selection using a user interface of said system.

10. The system of claim 9, wherein said user interface of said system comprises a trigger, and wherein said firing mechanism comprises said trigger.

11. The system of claim 10, wherein said trigger is actuable at multiple user-selectable positions, and wherein a first user-selectable position sets the location of the point of impact, and a second user-selectable position commands the system to fire said projectile.

12. The system of claim 1, wherein said system is configured to scan an environment and select at least one target within said environment.

13. The system of claim 12, wherein said system is configured to create a priority ranking of said at least one target.

14. The system of claim 12, wherein said system is configured to select a non-lethal target, based on said scan.

15. The system of claim 12, wherein said system is configured to select a lethal target, based on said scan.

16. The system of claim 1, wherein said at least part of a firing mechanism is a barrel of said firearm.

17. The system of claim 16, wherein the system tracks the location of said at least one point of impact relative to said beacon within said environment.

18. The system of claim 1, wherein the system comprises a beacon within said environment.

19. A method for aiming a firearm, comprising the following steps:
   obtaining a system comprising hardware configured to:
      set a location of at least one point of impact of a projectile within an environment with the aid of a sight of a firearm;
      track the location of said at least one point of impact within said environment;
      adjust the position of at least part of a firing mechanism of said firearm to maintain a potential projectile flight path corresponding with said at least one point of impact within said environment; and fire said projectile along said flight path upon a command to fire said projectile at said at least one point of impact;

setting a location of at least one point of impact of a projectile within an environment with the aid of said system and a sight of a firearm;

tracking the location of said at least one point of impact with said system;

adjusting the position, with the aid of said system, of at least part of a firing mechanism of said firearm to maintain a potential flight path of a projectile corresponding with said at least one point of impact within said environment; and firing said projectile along said flight path upon a command to fire said projectile at said at least one point of impact.

* * * * *